United States Patent
Flamm

[15] 3,704,794
[45] Dec. 5, 1972

[54] VEHICLE MOUNTED EQUIPMENT DECK AND RAMP

[72] Inventor: James R. Flamm, 227 East Main, Rexburg, Idaho 83440

[22] Filed: Nov. 17, 1970

[21] Appl. No.: 90,328

Related U.S. Application Data

[63] Continuation-in-part of Ser. No. 12,193, Feb. 18, 1970, Pat. No. 3,613,920.

[52] U.S. Cl....................................214/85, 296/1 A
[51] Int. Cl...............................................B65g 67/02
[58] Field of Search......................214/85; 296/3–14, 296/1 A

[56] References Cited

UNITED STATES PATENTS

| | | | |
|---|---|---|---|
| 3,138,272 | 6/1964 | Flowers | 214/85 |
| 2,574,483 | 11/1951 | Jack | 296/3 |
| 2,729,501 | 1/1956 | Van Doorne et al. | 296/10 X |
| 313,753 | 3/1885 | Moore | 296/4 |

FOREIGN PATENTS OR APPLICATIONS

| | | | |
|---|---|---|---|
| 357,554 | 8/1922 | Germany | 296/4 |

*Primary Examiner*—Albert J. Makay
*Attorney*—Clarence A. O'Brien and Harvey B. Jacobson

[57] ABSTRACT

A support deck selectively mountable within a pickup truck box so as to define an elevated platform over the wheel well covers whereby the full width of the box can be utilized for the accommodation of snowmobiles or the like. The deck, either in its entirety or along the rear portion thereof, slopes downwardly so as to facilitate the movement of snowmobiles thereon and therefrom. Access to the rear of the deck is provided by means of a removable inclined ramp.

10 Claims, 11 Drawing Figures

PATENTED DEC 5 1972 3,704,794

James R. Flamm
INVENTOR.

BY *Clarence A. O'Brien*
*and Harvey B. Jacobson*
Attorneys

PATENTED DEC 5 1972 3,704,794
SHEET 2 OF 3
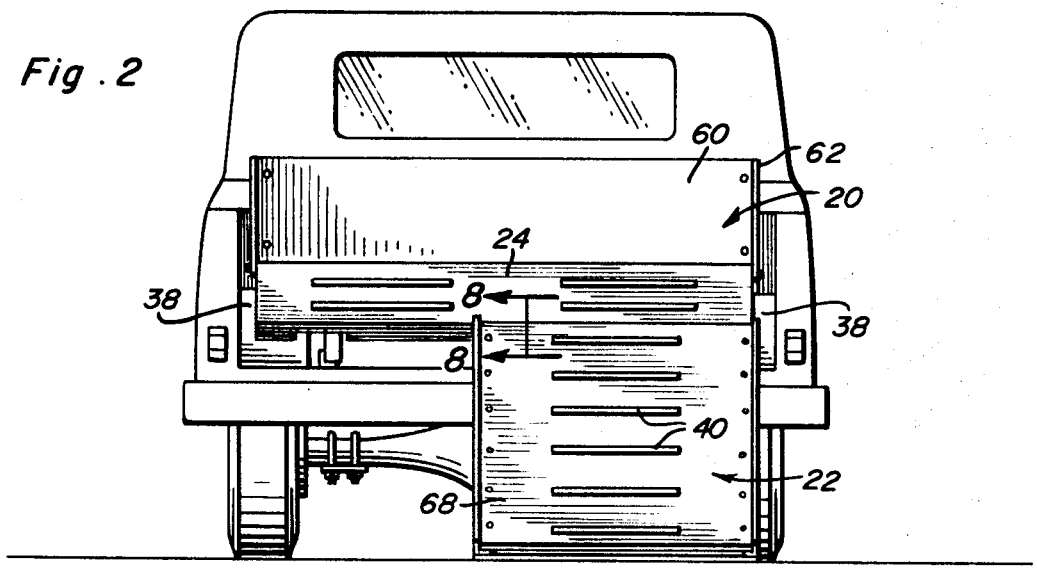
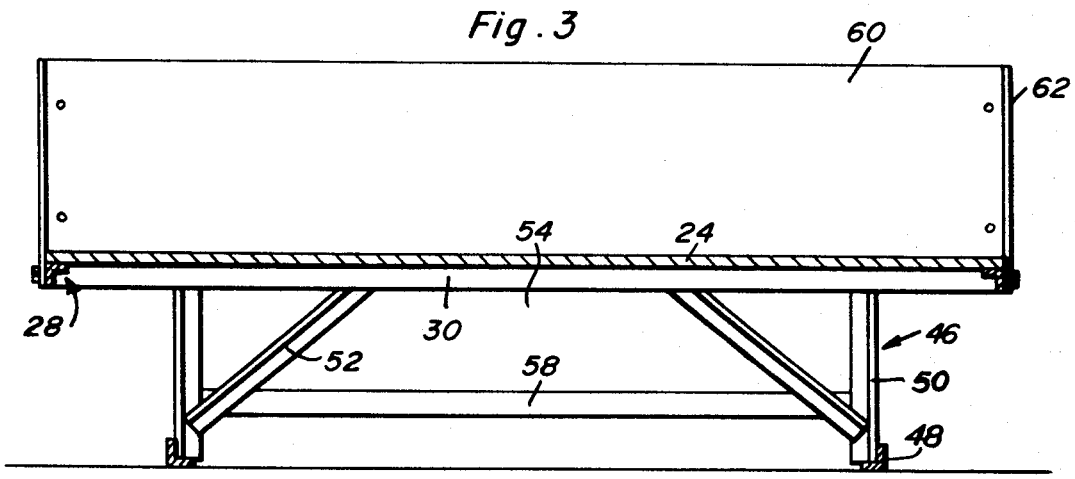
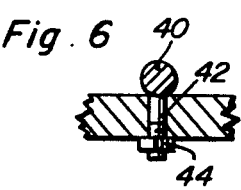
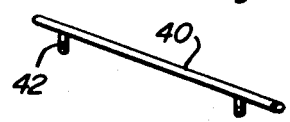
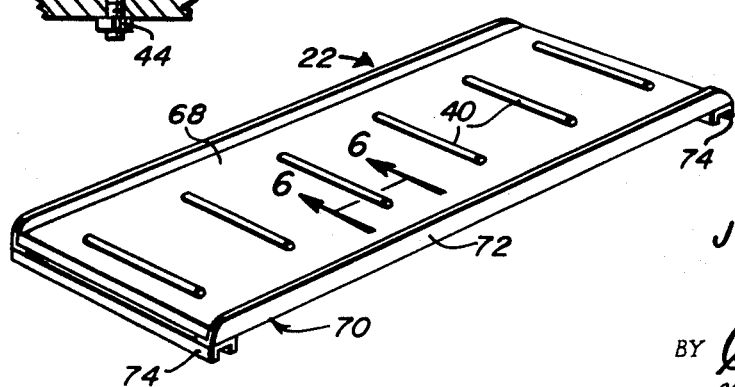
James R. Flamm
INVENTOR.
BY Clarence A. O'Brien
and Harvey B. Jacobson
Attorneys

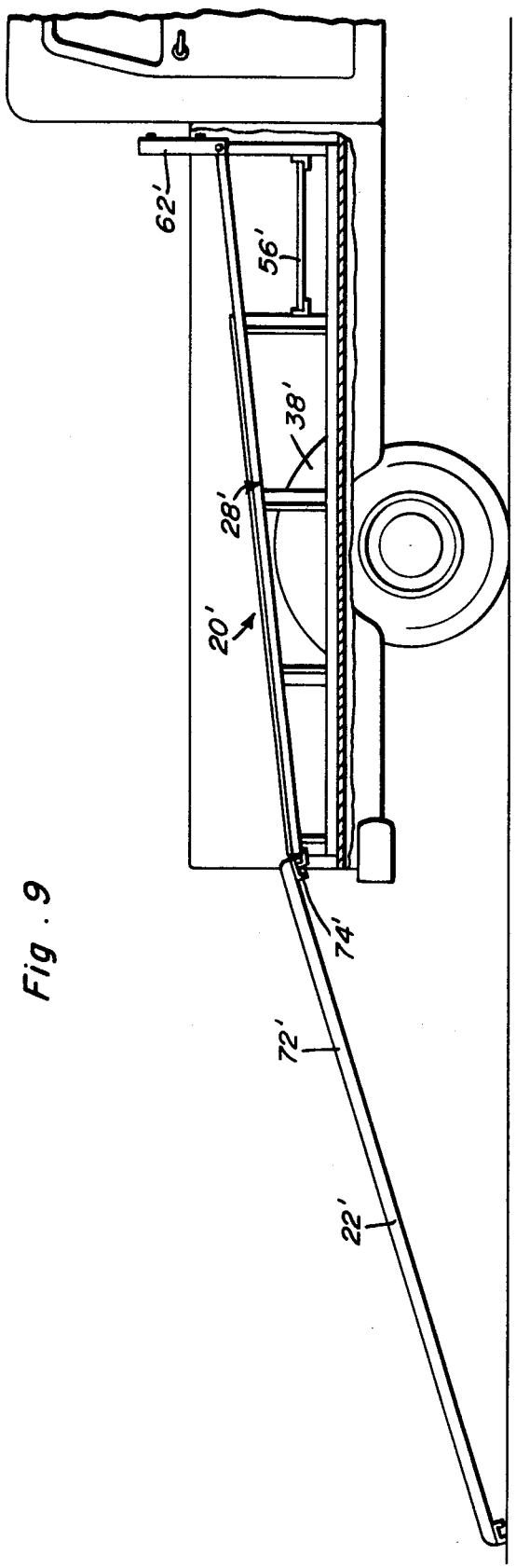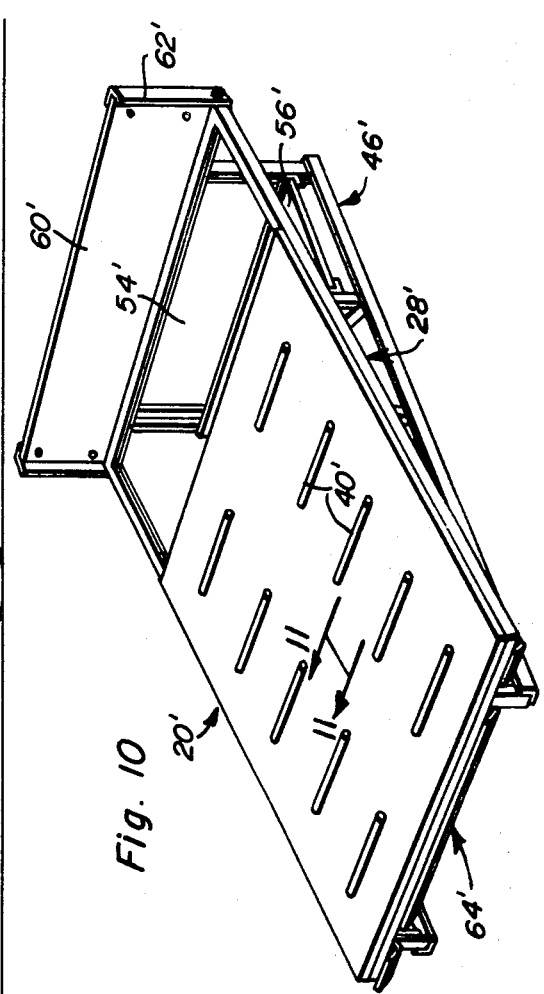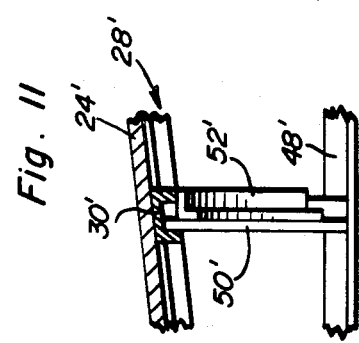

3,704,794

VEHICLE MOUNTED EQUIPMENT DECK AND RAMP

This is a continuation-in-part of application Ser. No. 12,193, for Equipment Deck and Ramp, filed Feb. 18, 1970, now U.S. Pat. No. 3,613,920.

The invention herein is concerned with means for adapting a conventional pickup truck so as to accommodate a pair of snowmobiles. More particularly, pickup truck boxes conventionally have the effective width thereof reduced through the provision of opposed inwardly and upwardly projecting wheel well covers. As such, the width of the load received within the box is necessarily restricted to the width between the covers. For example, in the conventional pickup truck, normally only a single snowmobile can be accommodated. Accordingly, the instant invention contemplates the provision of an elevated deck which is of a height so as to overlie the wheel covers and extend across the maximum width of the pickup truck box from one side panel to the other. In this manner, the effective width of the box is substantially increased and, as one practical result, can now easily accommodate a pair of side by side snowmobiles.

By utilizing an elevated deck, it will be appreciated that two separate storage areas are provided, the upper area, normally for large objects such as snowmobiles or the like, and the bed of the box itself for other equipment. It is contemplated that the deck be both easily positioned and removed from the box with the installed deck requiring no mechanical fasteners or the like. Access to the installed deck is to be obtained through the utilization of an elongated removable inclined ramp which is of a lesser width than the deck and selectively movable so as to align with any portion of the deck to which a snowmobile is to be introduced.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 2 is a rear elevational view of the truck mounted deck and ramp;

FIG. 3 is an enlarged cross-sectional view taken substantially on a plane passing along line 3—3 in FIG. 1;

FIG. 5 is a perspective view of the ramp;

FIG. 6 is an enlarged cross-sectional detail taken substantially on a plane passing along line 6—6 in FIG. 5;

FIG. 7 is a perspective view of one of the traction rods;

FIG. 9 is a side elevational view illustrating a modified form of deck mounted in operative position;

FIG. 10 is a perspective view of the deck of FIG. 9; and

FIG. 11 is a cross-sectional detail taken substantially on a plane passing along line 11—11 in FIG. 10.

Figure 1:
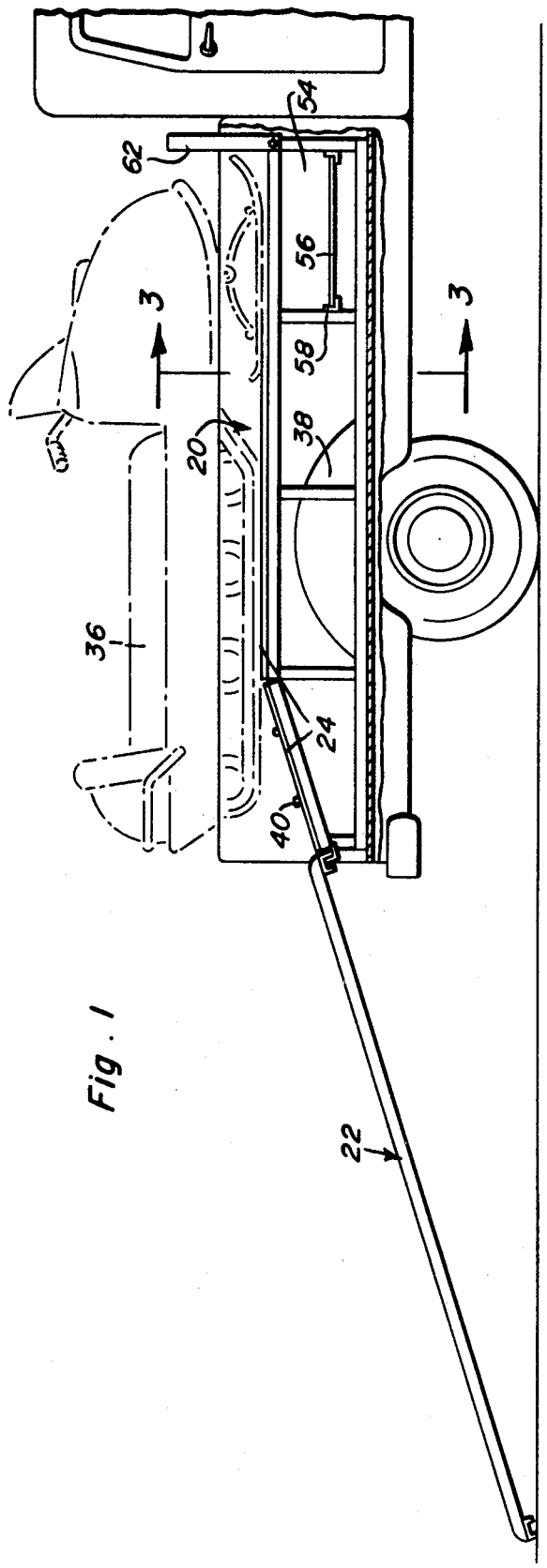
FIG. 1 is a side elevational view, wit portions broken away, of a pickup truck with the structure of the instant invention mounted thereon.

Referring now more specifically to the drawings, reference numeral 20 is used to generally designate the equipment deck comprising the instant invention, the ramp associated therewith being designated by reference numeral 22.

The deck 20 is rectangular in plan and formed basically of a surface panel or sheet 24 and a supporting framework 26 therefor. The framework 26 consists basically of a pair of laterally spaced angle iron side rails 28 interconnected by a series of transversely extending channel rails or beams 30 which define both a pair of opposed end beams and a plurality of intermediate beams paralleling the end beams. Each of the side rails 28 is orientated so as to provide an inwardly directed horizontal flange 32 and a depending outer flange 34. The rails or beams 30 open downwardly so as to provide a flat top and laterally spaced depending flanges with the opposed ends of the rails 30 being abutted against and rigidly welded to the side rails 28. In this manner, a rigid frame is provided for the reception of the support surface panel 24.

As will be particularly appreciated from FIG. 1, the equipment, or more particularly the snowmobiles 36 are to set on the deck 20 in an elevated position over the wheel well covers or housings 38. In order to facilitate movement of the snowmobiles 36 into the desired elevated stored position on the deck 20, it will be noted that the rear portion of the deck 20, for approximately 25 percent of the length thereof, is inclined downwardly and rearwardly. This is effected basically by downwardly angling the rear portions of the side rails 28 and forming the support surface panel 24 in two sections so as to follow both the horizontal and inclined portions of the side rails or top of the framework 26. If deemed desirable, appropriate elongated traction rods 40 can be mounted on the inclined portion of the deck. These rods 40 have been detailed in FIGS. 6 and 7, each rod including a pair of depending threaded stubs 42 receivable through preformed holes in the deck surface and receiving locking nuts 44 threaded thereon from the undersurface of the surface forming panel.

As previously indicated, the equipment deck 20 is to be positioned within the pickup box of a pickup truck and orientated in spaced relation above the box bed a distance sufficient so as to overlie the wheel covers or housings 38 and provide a flat support surface extending in an unobstructed manner between the opposed sides of the truck box.

The deck 20 is supported or maintained in the desired elevated position by means of a pair of elongated leg units 46 extending longitudinally along the deck below the crossbeams 30 and in parallel inwardly spaced relation to the opposed sides thereof. In this manner, the side portions of the deck 20 define lateral overhangs which overlie the wheel covers 38 while the inwardly spaced leg units 46 engage and sit on the pickup box bed. Each of the leg units 46 includes an elongated angular base rail or stringer 48 and a plurality of angular uprights or legs 50 which extend vertically upward from each of the base rails 48 into welded engagement with the overlying downwardly opening channel beams or rails 30. Each of the leg units 46 is stablized or braced by a series of diagonal angle braces 52 welded to the lower portion of each upright 50 and extending upwardly and inwardly therefrom into engagement with the central portion of the associated beam or rail 30 to which it is also permanently affixed as by welding.

Figure 4:
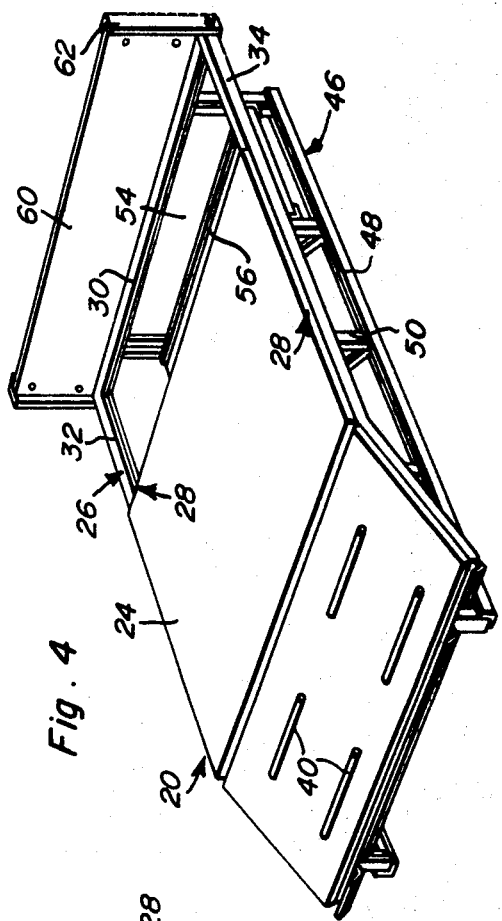
FIG. 4 is a perspective view of the deck.

With reference to FIGS. 1 and 4 in particular, it is contemplated that the support panel 24 terminate short of the forward end of the deck 26 so as to define a full width storage well 54. The bottom of this well is defined by a full width shelf 56 supported on a pair of transversely extending angle members 58 welded to the laterally spaced leg units. As will be appreciated, the width of the well 54 itself is to be such so as to not interfere with a proper support of the snowmobile 36 or the like to be supported on the horizontal portion of the deck.

At the extreme forward end of the deck 20 there is provided a vertically orientated panel 60 which functions as a cab guard to limit the forward position of any equipment introduced onto the deck 20. This guard 60 can easily be mounted by utilizing a pair of opposed upwardly extending angle posts 62 bolted or welded to the framework and in turn having the guard 60 affixed thereto.

The deck 20 includes means for releasably securing the ramp 22 to the rear edge thereof so as to enable the introduction of a snowmobile 36 or the like thereto. Such means are in the nature of a series of brackets 64 formed of upwardly directed channel members internested with the downwardly directed rear channel beams 30 and offset rearwardly relative thereto. In this manner, each of the channel brackets 64 defines an upwardly directed rear flange 66 spaced slightly outward from the rear of the deck, the bracket members 64 of course being rigidly welded to the rear crossbeam 30.

The ramp 22 is of an elongated rectangular configuration, narrower than the deck and of a length so as to incline at an easily negotiable angle between the rear of the truck mounted deck 20 and the ground level. As will be appreciated, the downward inclination of the rear portion of the deck 20 allows for the use of a relatively shorter ramp 22 while still achieving an angle at which the snowmobiles 36 can easily move.

The ramp 22 consists basically of a support panel 68 and an underlying framework 70. The framework consists basically of angle iron side rails 72 and transverse downwardly opening end channel members 74. The angle iron side rails 72 have the vertical flanges thereof upwardly directed so as to receive the support panel 68 therebetween with these flanges projecting slightly above the upper surface of the panel 68 so as to act as side guides or retaining flanges for the equipment moving thereover. If deemed necessary or desirable, additional bracing can be provided on the supporting framework 70 below the panel 68.

Figure 8:
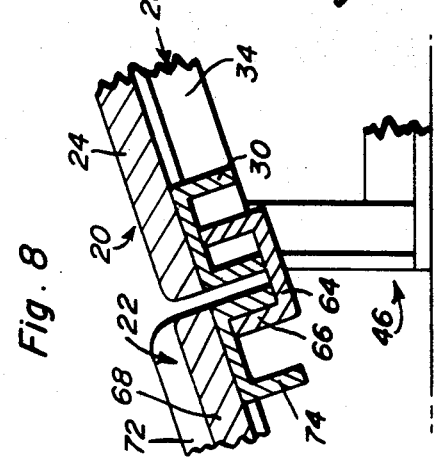
FIG. 8 is an enlarged cross-sectional detail taken substantially on a plane passing along line 8—8 in FIG. 2.

The end transverse channel beam 74 located at that end of the ramp 22 which is to constitute the upper end, the ramp itself being reversible, is engaged with the bracket members 64 in the manner detailed in FIG. 8 by a reception of the rear bracket flange or flanges 66 therein. In this manner, a releasable locking of one end of the ramp 22 to the rear of the deck 20 is effected with the opposite end of the ramp 22 resting on the ground. The bracket members 64 are of course to be spaced along the rear crossbeam 30 in a manner so as to enable an alignment of the ramp 22 with any portion of the deck for a positioning of the equipment thereon. If deemed desirable, the bracket means, rather than being a plurality of separate bracket members 64, can in fact constitute a single elongated member. Upon engagement of the ramp crossbeam 74 with the bracket member 64, it will be noted that the corresponding engaging flanges seat against each other for the full height thereof so as to provide a wide bearing surface. Further, the corresponding beam 74 and the bracket members 64 are so sized and orientated as to, when engaged, provide for a substantially coplanar orientation of the top panel 68 of the ramp and the rear inclined portion of the deck. If deemed necessary, additional traction can be provided on the ramp panel 68 by the use of the afore-described traction rods 40.

It should be appreciated that the support panels of both the deck and the ramp can be formed of any appropriate material, such as sheet metal or plywood. Likewise, appropriate fiber glass reinforced plastics can also be utilized, in which case, for example, a desirable traction surface can be molded directly thereinto. In fact, should manufacturing techniques make such feasible, the entire deck, including the support panel and the leg units can be molded as an integral unit.

Referring now specifically to FIGS. 9, 10 and 11, a variation in the deck construction has been illustrated therein. This variation differs from that of FIGS. 1 through 8 only in that the deck, designated by reference numeral 20', is inclined along the full length thereof and will normally be provided with a traction surface or traction rods 40' from one end to the other. Inasmuch as the deck 20' is, aside from the full length inclination thereof, structurally the same as the deck 20, primes of the numbers of the components of the first form have been used to designate the similar components in the second form. In providing for the full length inclination of the deck 20' it will be appreciated that the width of the deck is maintained constant throughout the length thereof with the deck being of a height so as to extend over the opposed wheel well covers. The leg units 46' are of course inwardly offset from the opposed edge beams 28' so as to define the wheel well cover overlying overhangs. The materials of the deck 20' will be same as those discussed supra with regard to the deck 20, and the ramp 22' will associate with the deck 20' in the same manner previously set forth with regard to the deck 20 and ramp 22.

From the foregoing, it will be appreciated that a unique structure has been defined for increasing the effective load carrying area of a pickup truck box. The deck of the instant invention, in conjunction with the ramp which cooperates therewith so as to simplify the introduction and removal of equipment therefrom, while relatively simple in construction, is considered unique in that the load area is increased without requiring any modification of the pickup box itself with the deck and ramp being quickly and easily both installed and removed as desired. The increase in the effective load carrying area of the box involves both the provision of a full width platform overlying the wheel covers for the accommodation of, as one example, side by side snow mobiles, and a separate support surface which, when taken with the truck bed itself, results in an approximate doubling of the load carrying surface area.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An equipment deck for pickup truck boxes and the like for increasing the effective loading area thereof, said deck being of a generally rectangular configuration, conforming in shape to the pickup box, said deck including an upper support surface and a lower support structure, said lower support structure being rigid with said upper support surface and depending vertically therefrom for engagement with a portion of a pickup box in a manner so as to position the support surface in an elevated position therein, overlying wheel housings and like obstacles, said support surface having side edges and end edges, said lower support structure comprising a pair of laterally spaced leg units in inwardly spaced relation to said side edges so as to define overhanging side portions on the upper support surface in laterally outward extending relation to the leg units whereby, upon an engagement of the leg units with the bed of a pickup truck box inward of the sides thereof, the overhanging portions will overlie the side located wheel covers or the like and provide a continuous support surface between the sides of the pickup box, and a storage well located adjacent one end edge of said support surface, said storage well including a bottom shelf mounted on and extending laterally between said leg units.

2. The structure of claim 1 including a vertically orientated guard panel projecting vertically upward from the upper support surface immediately outward of the storage well.

3. The structure of claim 1 wherein said upper support surface includes a horizontal portion in addition to the inclined portion, said horizontal portion constituting the major portion of the support surface, said inclined portion constituting that portion corresponding with the rear of the pickup box and inclining downwardly relative to the horizontal portion.

4. The structure of claim 1 wherein the upper support surface inclines along the full length thereof, said inclination extending upwardly along the deck from a first end positionable over the rear portion of a pickup truck box and a second end positionable forward thereof within the pickup truck box.

5. An equipment deck for pickup truck boxes and the like for increasing the effective loading area thereof, said deck being of a generally rectangular configuration, conforming in shape to the pickup box, said deck including an upper support surface and lower support structure, said lower support structure being rigid with said upper support surface and depending vertically therefrom for engagement with a portion of a pickup box in a manner so as to position the support surface in an elevated position therein, overlying wheel housings and like obstacles, said support surface having side edges and end edges, said lower support structure being spaced inwardly from said side edges so as to define overhanging side portions on the upper support surface in laterally outward extending relation to said support structure whereby, upon an engagement of the support structure with the bed of a pickup truck box inward of the sides thereof, the overhanging portions will overlie the side located wheel covers or the like to provide a continuous support structure between the sides of the box, and a storage well located adjacent one end edge of said support surface and including a bottom shelf mounted to and extending laterally of said support structure.

6. The structure of claim 5 including a vertically oriented guard panel connected to and projecting vertically upward from said support structure immediately outward of said storage well.

7. The structure of claim 6 wherein said lower support structure comprises a pair of laterally spaced leg units, said bottom shelf extending laterally between said leg units.

8. An equipment deck for pickup truck boxes and the like for increasing the effective loading area thereof, said deck being of generally rectangular configuration, conforming in shape to the pickup box, said deck including an upper support surface and a lower support structure, said upper support surface inclining for at least a portion of the length thereof, said lower support structure being located inwardly from the side edges of said upper support surface and for engagement with the bed of the pickup box in a manner so as to position the support surface in an elevated position therein overlying wheel housings and like obstacles, said deck being provided with opposed side edges and opposed end edges, one end edge of said deck lying along said inclined portion and having bracket means provided therealong, and an elongated ramp having one end selectively engaged with said bracket means for an extension of the ramp between the end of the deck, when mounted to a pickup truck and the ground such that said ramp is generally coplanar with said inclined portion of said support surface.

9. The structure of claim 8 wherein said ramp is narrower than said support surface and alignable at selected points along the end edge with said bracket means thereon.

10. The structure of claim 9 wherein said upper support surface includes a horizontal portion in addition to said inclined portion, said horizontal portion constituting a major portion of said support surface, said inclined portion constituting that portion corresponding to the rear of the pickup box and inclining downwardly relative to the horizontal portion.

* * * * *